(12) United States Patent
Simic et al.

(10) Patent No.: US 6,903,684 B1
(45) Date of Patent: Jun. 7, 2005

(54) METHOD AND APPARATUS FOR OPTIMIZING GPS-BASED POSITION LOCATION IN PRESENCE OF TIME VARYING FREQUENCY ERROR

(75) Inventors: Emilija Simic, La Jolla, CA (US); Christopher Patrick, San Diego, CA (US); Douglas Rowitch, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 77 days.

(21) Appl. No.: 10/404,711

(22) Filed: Mar. 31, 2003

Related U.S. Application Data
(60) Provisional application No. 60/440,960, filed on Jan. 16, 2003, and provisional application No. 60/420,583, filed on Oct. 22, 2002.

(51) Int. Cl.[7] ............................................. H04B 7/185
(52) U.S. Cl. ............................... 342/357.15; 342/357.1
(58) Field of Search ....................... 342/357.15, 357.1, 342/357.12

(56) References Cited

U.S. PATENT DOCUMENTS

| | | | | |
|---|---|---|---|---|
| 5,175,557 A | * | 12/1992 | King et al. | 342/357.12 |
| 5,739,786 A | * | 4/1998 | Greenspan et al. | 342/357.1 |
| 5,798,732 A | * | 8/1998 | Eshenbach | 342/357.12 |
| 6,067,503 A | * | 5/2000 | Yakos | 701/213 |
| 6,144,918 A | * | 11/2000 | Meng et al. | 342/357.01 |
| 6,191,730 B1 | * | 2/2001 | Nelson, Jr. | 342/357.12 |
| 6,331,836 B1 | | 12/2001 | Jandrell | 342/357.12 |
| 6,411,892 B1 | * | 6/2002 | van Diggelen | 342/357.09 |
| 2002/0123316 A1 | | 3/2001 | Sih et al. | |
| 2003/0016169 A1 | * | 1/2003 | Jandrell | 342/357.12 |
| 2003/0081660 A1 | * | 5/2003 | King et al. | 375/150 |
| 2003/0201935 A1 | * | 10/2003 | King et al. | 342/357.15 |
| 2003/0214436 A1 | * | 11/2003 | Voor et al. | 342/418 |

FOREIGN PATENT DOCUMENTS

| | | | | |
|---|---|---|---|---|
| JP | 05087900 A | * | 4/1993 | G01S/01/00 |
| WO | 0106274 | | 1/2001 | G01S/5/14 |

* cited by examiner

Primary Examiner—Thomas H. Tarcza
Assistant Examiner—F H. Mull
(74) Attorney, Agent, or Firm—Philip Wadsworth; Charles D. Brown; Donald Kordich (57) ABSTRACT

Position determination accuracy of a wireless communication device may be negatively affected by a large unaccounted GPS doppler bias, which in turn may affect GPS doppler estimations and GPS doppler measurements conducted by the wireless communication device. The quality of GPS doppler measurements is very important for position location, because poor quality GPS doppler measurements may prevent the wireless communication device from acquiring satellites in the most sensitive modes with narrow frequency ranges, which results in reduced GPS pseudorange measurement yield. Large unaccounted GPS doppler bias also adversely affects position accuracy because of the adverse effect on the GPS code phase measurements time propagation to common time prior to their use in position location calculation. The same is true in the case of unaccounted CDMA code doppler, through the adverse effect on the AFLT code phase measurements time propagation to common time prior to their use in a position location engine. This effect is the biggest concern in the case of large search windows. Therefore, the present disclosure provides a method of optimizing GPS based position location in the presence of time-varying frequency error, including the steps of continuously measuring and/or calculating resulting GPS doppler bias and CDMA code doppler bias and then minimizing their adverse effects with regard to position location determination by re-centering GPS doppler search windows based on the GPS doppler bias value, as well as using GPS doppler bias and CDMA code doppler bias value to properly propagate GPS pseudorange and AFLT pilot phase measurements, respectively, to common time prior to their use in a position location engine.

10 Claims, 3 Drawing Sheets

METHOD AND APPARATUS FOR OPTIMIZING GPS-BASED POSITION LOCATION IN PRESENCE OF TIME VARYING FREQUENCY ERROR

RELATED APPLICATIONS

This application claims priority from U.S. Provisional Application No. 60/420,583, filed on Oct. 22, 2002, and U.S. Provisional Application No. 60/440,960, filed on Jan. 16, 2003.

BACKGROUND OF THE INVENTION

1. Field of the Disclosure

The present disclosure relates to communication systems and, more specifically, the present disclosure relates to systems and techniques for locating the position of a wireless communication device in a Code Division Multiple Access system.

2. Description of the Related Art

Mobile communications networks are in the process of offering increasingly sophisticated capabilities for locating the position of a mobile terminal of the network. The regulatory requirements of a jurisdiction may require a network operator to report the location of a mobile terminal when the mobile terminal places a call to an emergency service, such as a 911 call in the United States. In a Code Division Multiple Access (CDMA) digital cellular network, the position location capability can be provided by Advanced Forward Link Trilateration (AFLT), a technique that computes the location of the mobile station (MS) from the mobile station's measured time of arrival of radio signals from the base stations (BS). A more advanced technique is hybrid position location, where the mobile station employs a Global Positioning System (GPS) receiver and the position is computed based on both AFLT and GPS measurements. A further application of the hybrid technique is when time obtained from a GPS-synchronous cellular network is used in obtaining the GPS measurements and computing the mobile station's position.

Currently, GPS receivers are being incorporated into mobile terminals in order to increase the accuracy of mobile terminal location determination. The GPS receivers can be autonomous and perform all GPS acquisition functions and position calculations (also know as standalone), or they can be non-autonomous (also known as wireless assisted) and rely on the cellular network for providing GPS acquisition data and possibly performing the position calculations. By receiving GPS aiding data from the network, a mobile terminal with GPS capability can obtain the time and position data from the GPS satellites in about 10 seconds or less, during a typical phone call. Many, if not most, CDMA wireless phones having GPS capability are expected to be wireless assisted GPS receivers having hybrid capability of providing both GPS and AFLT position information upon the request of a serving base station handling a call from the wireless phone. The position location session can be MS-assisted or MS-based, depending on where the position computation takes place. In the MS-assisted case, the mobile station sends back raw or pre-processed measurement data to the base station. A network entity then computes the location. In the MS-based case, the position computation is performed in the mobile station.

Message protocols and formats for CDMA position location employing AFLT, GPS and hybrid receivers, applicable to both the MS-based and MS-assisted cases, have been published in TIA/EIA standard IS-801-1 2001, Position Determination Service Standard for Dual-Mode Spread Spectrum Systems.

Another position location technique is where the measurements are made by a network entity, rather than the mobile station. An example of these network-based methods is the RTD measurement carried out by the serving base stations. Measurements made by the mobile station may be combined with network-based measurements to enhance the availability and accuracy of the computed positions.

SUMMARY OF THE INVENTION

Position determination accuracy of a mobile station, or wireless communication device, may be negatively affected by a large GPS doppler bias, which in turn may affect GPS doppler estimations and GPS doppler measurements conducted by the wireless communication device. The quality of GPS doppler measurements is very important for position location, because poor quality measurements may prevent the wireless communication device from acquiring satellites in the most sensitive modes that have a narrow frequency range, resulting in reduced GPS measurement yield. Large unaccounted doppler bias in GPS measurements also adversely affects position accuracy because of the adverse effect on the GPS code phase measurement time propagation to common time. This effect is of the biggest concern in the case of large search windows. In addition, poor doppler measurement quality will also directly impact velocity estimation of the wireless communication device.

Additionally, handset designers may opt to use PLLs that were deliberately designed to have static errors in its frequency output. Furthermore, these static frequency offsets may vary depending on the PLL output frequency. While these CDMA channel frequency dependent offsets may not impact CDMA performance, they will have the same effect on GPS performance as GPS doppler bias discussed above. In addition, they will further degrade position location accuracy through adverse effect on the AFLT code phase measurement propagation to common time prior to their use in the position location engine.

In view of these problems, a basic aspect of the present disclosure provides a method of determining a search window center for searching for a GPS satellite, including the steps of continuously measuring and/or calculating GPS doppler bias and then minimizing the GPS doppler bias adverse effects with regard to position location determination by centering or re-centering GPS doppler search windows based on the GPS doppler bias value.

In accordance with another aspect of the present disclosure, disclosed is a method of accounting for a GPS doppler bias value during the time propagation of GPS code phase measurements to common time prior to reporting the code phase measurements to the positioning determining entity (PDE) in a pseudo-range measurement (PRM) message, or prior to using GPS measurements in a position location calculation in a wireless device.

In accordance with another aspect of the present disclosure, disclosed is a method of accounting for residual CDMA code doppler during the time propagation of AFLT code phase measurements to common time prior to reporting the code phase measurements to the positioning determining entity (PDE) in a pilot phase measurement (PPM) message and/or prior to using AFLT measurements in a wireless device's own position location engine.

Acquisition of a satellite in the most sensitive mode with a narrow frequency range is achieved by re-centering a GPS doppler search window based on the GPS doppler bias values. Improvement in position location accuracy is achieved by accounting for the appropriate doppler bias values during time propagation of both GPS and AFLT code phase measurements to common time. These improvements provide increased GPS pseudorange measurement yield and position accuracy in the wireless communication position tracking and location system as disclosed herein.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

A novel and improved method and apparatus for performing position location in a wireless communications system is described. The exemplary embodiment is described in the context of the digital cellular telephone system. While use within this context is advantageous, different embodiments of the invention may be incorporated in different environments or configurations.

In general, the GPS constellation consists of 24 satellites: 21 space vehicles (SVs) used for navigation and 3 spares. Each SV contains a clock that is synchronized to GPS time by monitoring ground stations. To determine a position in time, a GPS receiver processes the signals received from several satellites. At least four satellites must be used to solve for the 4 unknowns, which are X, Y, Z and time. It should be appreciated, however, that the invention is not limited to the use of any particular kind of global satellite system for assisting position location.

In general, to practice the present disclosure with any kind of wireless communication network, such as a TDMA cellular telephone network, it is advisable to consult the applicable industry standards for specifications regarding compatible location services. For example, the following detailed description refers to the TIA/EIA standard IS-801-1 2001, Position Determination Service Standard for Dual-Mode Spread Spectrum Systems, which is especially adapted for a CDMA network using AFLT and GPS. The TIA/EIA standard ANSI-136 (System Assisted Mobile Positioning through Satellites) is adapted to TDMA digital PCS systems in the United States. The 3rd Generation Partnership Project standards 3GPP TS 04.31 and TS 25.331 Location Services (LCS) (UE position using OTDOA) are adapted to European GSM wireless telecommunication networks.

There are two reasons identified that are likely to cause CDMA channel independent GPS doppler measurement biases. One reason is temperature induced drift in the output frequency of the voltage controlled, temperature controlled, oscillator (VCTCXO), due to the power amplifier (PA) being turned off during CDMA-to-GPS switching. The other reason includes steady state VCTCXO control voltage TRK_LO_ADJ) Vdd shifts that are most likely brought about due to changes in the load currents.

In wireless telecommunication networks, frequency tracking loops are used in the wireless devices, or mobile stations, to track-out any shifts in carrier frequency. This eliminates concern about any VCTCXO drift or VCTCXO control voltage (TRK_LO_ADJ) Vdd shifts. While this is true when wireless devices are operating in the CDMA mode, it is not necessarily true when the wireless device operates in GPS mode. For wireless assisted operation, the frequency tracking loop is disabled during GPS processing since the wireless device is always in an acquisition mode. This means that the VCTCXO is free-running while the receiver is tuned away from the CDMA band and while the receiver is processing GPS signals. The resulting drift exhibited on the LOs or any TRK_LO_ADJ Vdd shifts will therefore directly affect GPS doppler estimation. For standalone operation, the device demodulates the GPS signal and even though frequency tracking thus becomes possible, it is not guaranteed for all operating conditions. In the absence of frequency tracking, VCTCXO is free-running again, and the resulting temperature drift and TRK_LO_ADJ shifts will again directly affect GPS Doppler estimation.

In order to reduce the temperature induced VCTCXO systematic drift, VCTCXO manufacturers would be required to improve maximum VCTCXO temperature stability and wireless device vendors would be required to address the wireless device design level considerations to reduce thermal gradients at VCTCXO. Examples of the design considerations include locating the PA as far from the VCTCXO as possible, incorporating isolating features into the wireless device enclosure design, and adding isolating material on or around the VCTCXO. Nevertheless, the maximum temperature stability slope of VCTCXOs is getting larger with the industry trend of downsizing VCTCXOs therefore requiring the use of digital VCTCXOs with digital temperature compensation. An additional industry trend is to design smaller form factor wireless devices rendering the wireless devices design level considerations that are mentioned above ineffective in reducing the thermal gradients at the VCTCXO.

In addition, it is unclear whether any commercially available regulator would be able to reduce VCTCXO control voltage Vdd shifts due to the changes in the load currents. Therefore, the CDMA channel independent GPS doppler bias correction scheme disclosed herein provides an effective and efficient means for continuously measuring CDMA channel independent GPS doppler bias and minimizing its adverse effects by centering or re-centering the GPS doppler search windows correspondingly, as well as accounting for the GPS doppler bias during the GPS measurement propagation to common time.

It is known that some wireless device designers may opt to use PLLs that are deliberately designed to have static errors in the frequency output. While these CDMA channel frequency dependent offsets may not impact CDMA performance, they will translate into CDMA channel dependent GPS doppler bias, with the same effect on GPS performance as the CDMA channel independent doppler bias discussed above, and therefore cannot be neglected. In addition, they will further degrade position location accuracy through adverse effect on the AFLT code phase measurement propagation to common time prior to their use in the position location engine.

Namely, while in CDMA mode, these frequency errors will be tracked out by frequency tracking loops by applying the appropriate correction to TRK_LO_ADJ, and using time tracking loops to track the resulting CDMA code doppler for CDMA demodulation. AFLT searching however does not currently include time tracking, resulting in CDMA code doppler error in AFLT measurements in the presence of these deliberately introduced CDMA frequency dependent offsets. Furthermore, in GPS mode, frequency tracking loops are open and TRK_LO_ADJ is frozen at its CDMA values, which is the opposite of this deliberately introduced CDMA frequency error. This error will therefore also translate into CDMA channel dependent GPS doppler bias in the GPS pseudorange measurements. Therefore, both the GPS pseudo-range and AFLT pilot phase measurements will exhibit their respective manifestations of CDMA channel dependent doppler bias that cannot be corrected with current wireless device configurations or the CDMA channel independent doppler bias correction scheme.

Therefore, this particular doppler bias is termed CDMA channel dependent doppler bias and this bias can be calculated by software that may be based on the UHF LO PLL frequency and divider ratio for that CDMA channel. The software calculated CDMA dependent doppler bias can then be used together with CDMA channel independent doppler bias as discussed above to repenter GPS doppler search windows and propagate both the GPS and AFLT code phase measurements as disclosed herein.

Therefore, according to the present disclosure, the GPS doppler measurement bias correction scheme consists of the steps of continuously measuring and/or calculating the CDMA channel independent and/or dependant doppler bias, then re-centering GPS doppler search windows correspondingly, and properly accounting for this bias during GPS, and in the case of CDMA channel dependent doppler bias, also during AFLT code phase measurement time propagation to common time. Also, the total GPS doppler bias gets subtracted from the measured GPS doppler prior to its being reported in the IS-801.1 PRM message to the PDE for MS-assisted mode, or prior to being used in position location and/or the velocity engine in a wireless device for MS-based or standalone mode.

The measured CDMA channel independent GPS doppler bias is stored in the wireless device's non-volatile (NV) memory as an NV item called NV_DOPPLER_BIAS. The calculated CDMA channel dependent doppler bias is normalized by the CDMA channel frequency and then stored in wireless device's volatile memory as a variable called DMSS_DOPPLER_BIAS, which will be used together with the NV item NV_DOPPLER_BIAS to re-center the GPS doppler search windows for all GPS search modes, as well as to correctly propagate GPS and AFLT code phase measurement to common time prior to their use in position location calculation. This re-centering of the GPS doppler search windows and propagation of code phase measurement to common time by DMSS_DOPPLER_BIAS accounts for the CDMA channel dependent portion of GPS doppler bias, thus allowing the NV item to remain a CDMA channel independent portion of GPS doppler bias.

According to the present disclosure, the loops in the CDMA channel independent doppler bias correction scheme include an open loop and a closed loop correction. The open loop correction consists of calibrating GPS doppler bias value of a wireless device and storing it in the wireless device's non-volatile memory as NV item called the NV_DOPPLER_BIAS. The closed loop correction consists of using a filtered version of CLOCK_DRIFT, if available, and if the wireless device is stationary (that is, in one embodiment defined as the velocity that does not exceed ten kilometers per hour), weighted by position uncertainty, to update this NV item. The CLOCK_DRIFT, position uncertainty and velocity information are provided to the wireless device via a position location response by the PDE in the MS-assisted call flows, or could be similarly calculated in the wireless device itself in MS-based and standalone cases. The CLOCK_DRIFT is calculated based on at least four GPS measurements. Another version of the closed loop correction is a filtered version of average doppler bias of all valid measurements reported, which could be weighted by measured C/Nos. This could also be used to update the NV item, if CLOCK_DRIFT is unavailable, and if more than a certain number of valid satellites are found and the wireless device is stationary, e.g. the estimated velocity does not exceed ten kilometers per hour. According to the present disclosure, a GPS pseudo-range measurement's doppler bias is the difference between the measured Doppler, and the propagated doppler estimated for a particular satellite by either the PDE in MS-assisted call flows (communicated to the wireless device via the Acquisition Assistance message), or wireless device itself in MS-based and standalone cases. The average is then taken across all valid measurements. The valid measurements are the best measurements that have passed false alarm, noise, jammer, cross-correlation or some other related test to filter out poor measurements.

Filtering is done via an IIR filter of the following form, $y(n)=(1-b)*y(n-1)+a*x(n)$, where a is programmable, $y(n)$ is the new value, while $y(n-1)$ is the old value of Doppler bias NV item, and $x(n)$ is weighted CLOCK_DRIFT, in which case b=0, or Average Doppler bias of all measurements reported, as discussed above, in which case b=a. Note that there is a check implemented for instantaneous change in the $x(n)$, namely if it becomes larger than some predetermined value Xo, the NV item will be updated with Xo, where the value of Xo is optimized and is different for acquisition and tracking modes.

The CDMA channel independent GPS doppler bias correction method, according to the present disclosure, has two distinct modes which include acquisition and tracking. The acquisition mode is used to help speed up disciplining a CDMA channel independent GPS doppler bias NV item to an individual wireless device's value during initial GPS usage of the wireless device. In this acquisition mode, a shorter acquisition time constant for IIR is used and the doppler search windows could be re-centered for the most sensitive modes with narrow frequency search space based on average measured doppler bias of valid satellites found in the shallower modes with wider frequency search space, weighted by measured C/Nos, provided more than X valid satellites are found and the wireless device is stationary. Valid satellites include the measured peaks that have passed false alarm, noise, jammer, cross-correlation or other tests.

The tracking mode is used in normal operation to track out any deviations in average measured CDMA channel independent GPS doppler bias, and this mode uses a longer tracking time constant for IIR.

A counter in the wireless device NV memory keeps track of how many times the acquisition mode is executed. The acquisition mode is switched to the tracking mode after the counter reaches a pre-set value, which in one embodiment is roughly four IIR acquisition time constants. According to the present disclosure, the doppler bias correction scheme for CDMA channel independent GPS doppler bias is different in factory test mode, which is limited to an open loop mechanism only, since the NV item update and the acquisition and tracking modes switching are not performed in the factory mode. In addition, a volatile memory variable, which is-initialized with the NV item value, could be used for the closed loop situation where this volatile memory variable would be updated with the IIR state based on average doppler of all valid measurements reported, and then used to re-center search windows for shallower modes with wider frequency search space. For the most sensitive modes with narrow frequency search space, the doppler window re-centering could be based on average measured doppler bias of valid satellites that are found in shallower modes with wider frequency search space, similarly to the re-centering of the doppler search windows utilized in the acquisition mode. It should be noted that the factory test mode IIR time constant may be different from the normal mode, and X may be set to zero.

In one embodiment, only a single measurement reference time would be used, even though the measurement may be taken at different times. This requirement is driven by IS-801.1. For each measurement, there exists a TIME_MEAS provided by the digital signal processor (DSP), which represents a time at which the measurement was taken. Both GPS and AFLT code phase measurements must be propagated to a common time prior to being reported in pseudorange and pilot phase measurements in the IS-801.1 messages, respectively, or prior to being used in the position location engine, even when one or more visits are required to complete the search. In this particular embodiment, a common time chosen is the C/No weighted average of all GPS measurement times, which are quantized to the closest GPS visit beginning time.

Errors in the propagation of the GPS and AFLT code phase measurements to common time TIME_REF contribute directly to errors in the wireless device position calculation. The doppler used in time propagation is measured doppler, rather than the predicted doppler and, therefore, any errors in measured doppler will directly affect the position accuracy. This result is especially pronounced in the large window scenarios where maximum session time of thirty second could, for example, for unaccounted CDMA channel independent GPS doppler error of 10 Hz result in potentially up to 57 meters of position error (assuming a DOP of 2).

The measured GPS code phase and measured GPS doppler for a particular satellite at a time TIME_MEAS are given by meas_code_phase GPS chips and dopp_meas in Hz, respectively. In order to estimate this code phase at some other instant of time, the wireless device measured doppler frequency, dopp_meas, measured in Hz at time TIME_MEAS, and the first order predicted doppler (DOPPLER1, measured in Hz per second) provided in the acquisition assistance message from the PDE (in MS-assisted case) or predicted by wireless device (in MS-based or standalone cases), must be used.

To propagate GPS code phase of a measurement to common time, TIME_REF, in the absence of the GPS doppler bias, the following equation is used:

$$\text{prop\_code\_phase(TIME\_REF)} = \text{meas\_code\_phase(TIME\_MEAS)} + \frac{f_{C_{GPS}}}{f_{L1}} \cdot \Delta t \cdot \text{dopp\_meas}(\Delta t) \quad (EQ1)$$

where $\Delta t = \text{TIME\_REF} - \text{TIME\_MEAS}$ (seconds) and $$\text{dopp\_meas}(x) = \text{dopp\_meas} + \frac{x \cdot DOPPLER1}{2}$$

while $f_{L1}$ is the L1 GPS frequency of 1.57542 GHz, and $f_{C_{GPS}}$, is GPS chip frequency of 1.023 MHz.

It can be seen that if the propagation time, $\Delta t$, is large and if there is also a large error component in dopp_meas due to GPS measurement doppler bias as discussed above, these factors combine to result in a large error in the propagated GPS code phase. Note that propagation time, $\Delta t$, will be large when a GPS session exceeds the time allocated to a single GPS visit, such as approximately two seconds, such that it has to be split out over several GPS visits. In between the GPS visits, and by design, the wireless device must tune back to CDMA mode The minimum CDMA tune back time determined to minimize drop call rate and impact on voice quality is approximately two seconds. The largest propagation time possible is the maximum total GPS session time allowed, and is equal to approximately thirty seconds.

In order to better understand this method of accruing GPS code phase error due to GPS measurement doppler bias, it should be noted that measured GPS doppler will consist of true GPS doppler, which ideally is very similar to predicted GPS doppler, and the undesired GPS doppler bias. The true GPS doppler will exist both over the GPS visit and the CDMA tune back, since it reflects satellite motion that is present through both the GPS and CDMA visits. As a result, the true GPS doppler is used in the propagation equation over the entire period $\Delta t$. GPS doppler bias may consist of CDMA channel independent and/or dependent GPS doppler biases; CDMA channel dependent GPS doppler bias will also be present throughout both the GPS and CDMA visits, as the VCTCXO value will be offset by the amount of deliberately introduced frequency error throughout both CDMA and GPS modes. CDMA channel independent GPS doppler bias, on the other hand, exists only during GPS visits and not CDMA tune backs. This is because during CDMA tune backs, the frequency tracking loop is on, driving any residual CDMA channel independent doppler bias to 0 Hz. As a result, CDMA channel independent doppler bias should not be used over the entire propagation period $\Delta t$, but rather only when propagating over GPS visits.

Accounting for the possible presence of the GPS doppler bias dopp_bias in the measured GPS doppler at time TIME_MEAS, we can write:

$$\text{dopp\_meas} = \text{dopp\_true} + \text{dopp\_bias} = \text{dopp\_true} + NV\_DOPPLER\_BIAS + f_{L1} * DMSS\_DOPPLER\_BIAS,$$

where NV_DOPPLER_BIAS is the CDMA channel independent portion of GPS doppler bias in Hz at TIME_MEAS, and DMSS_DOPPLER_BIAS is the CDMA channel dependent portion of doppler bias at TIME_MEAS, normalized to CDMA channel frequency it is calculated at, and dopp_true is the true GPS doppler at TIME_MEAS.

Furthermore, let's define M CDMA successive tune-backs between TIME_REF and TIME_MEAS as CDMA tune-backs 1, 2, ..., M, where CDMA tune-back 1 is the CDMA tune-back closest in time to TIME_REF, CDMA tune-back 2 is the next closest in time to TIME_REF, and so forth, with CDMA tune-back M being the CDMA tune-back closest in time to TIME_MEAS. Let's further denote $t_{1,2,\ldots,2M}$ to be the successive time boundaries of these CDMA tune-backs.

Figure 2A:
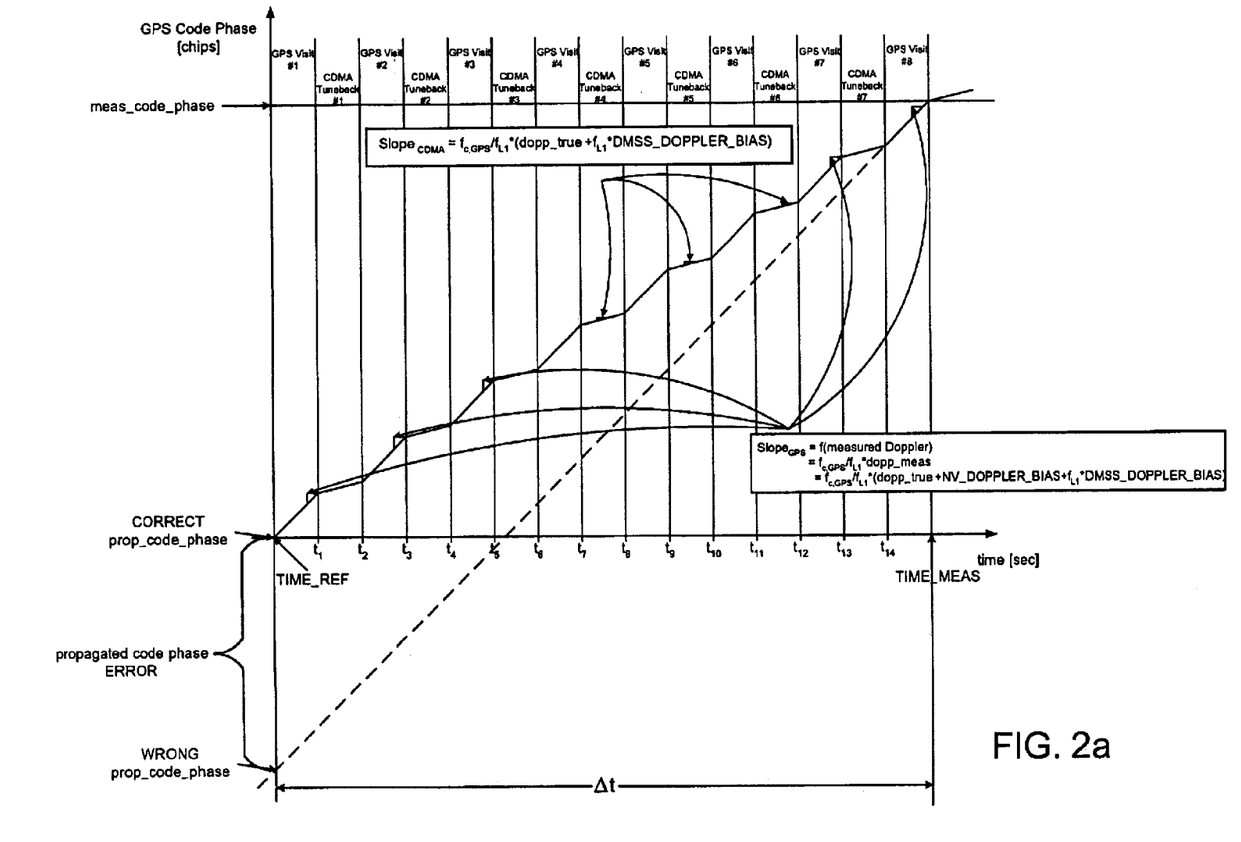
FIG. 2a illustrates GPS code phase measurement time propagation backward in time over multiple GPS visits.

It therefore follows that if the GPS code phase measurements propagation happens backwards in time, i.e. from TIME_MEAS to some earlier TIME_RFF (i.e. TIME_REF<TIME_MEAS), as illustrated in FIG. 2a, labeling of M successive CDMA tune-backs between the TIME_REF and TIME_MEAS coincides with their order in time, with CDMA tune-back 1 being the first, and the CDMA tune-back M being the last CDMA tune-back in time. In this case, $t_{1,2,\ldots,2M}$ represent the beginning and finishing times of these CDMA tune-back. If, on the other hand, GPS code phase measurements need to be propagated forward in time, i.e. from TIME_MEAS to some later TIME_REF (i.e.

Figure 2B:
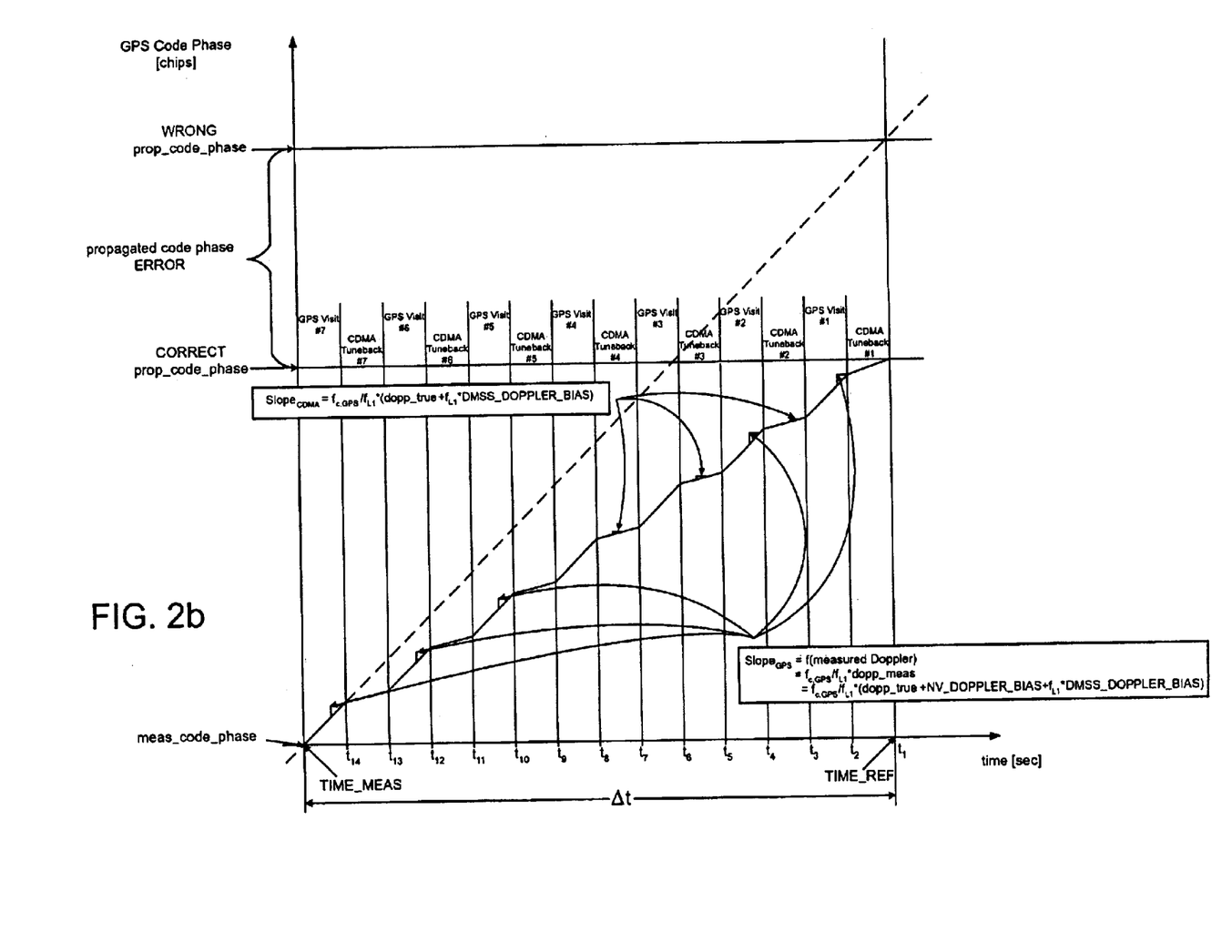
FIG. 2b illustrates GPS code phase measurement time propagation forward in time over multiple GPS visits.

TIME_REF>TIME_MEAS), as illustrated in FIG. 2b, labeling of M successive CDMA tune-backs between the TIME_REF and TIME_MEAS is now contrary to their order in time. Namely, CDMA tune-back 1 is now the last, and CDMA tune-back M is the first CDMA tune-back in time, with $t_{1,2,\ldots,2M}$ now representing their finishing and beginning times.

Figure 1:
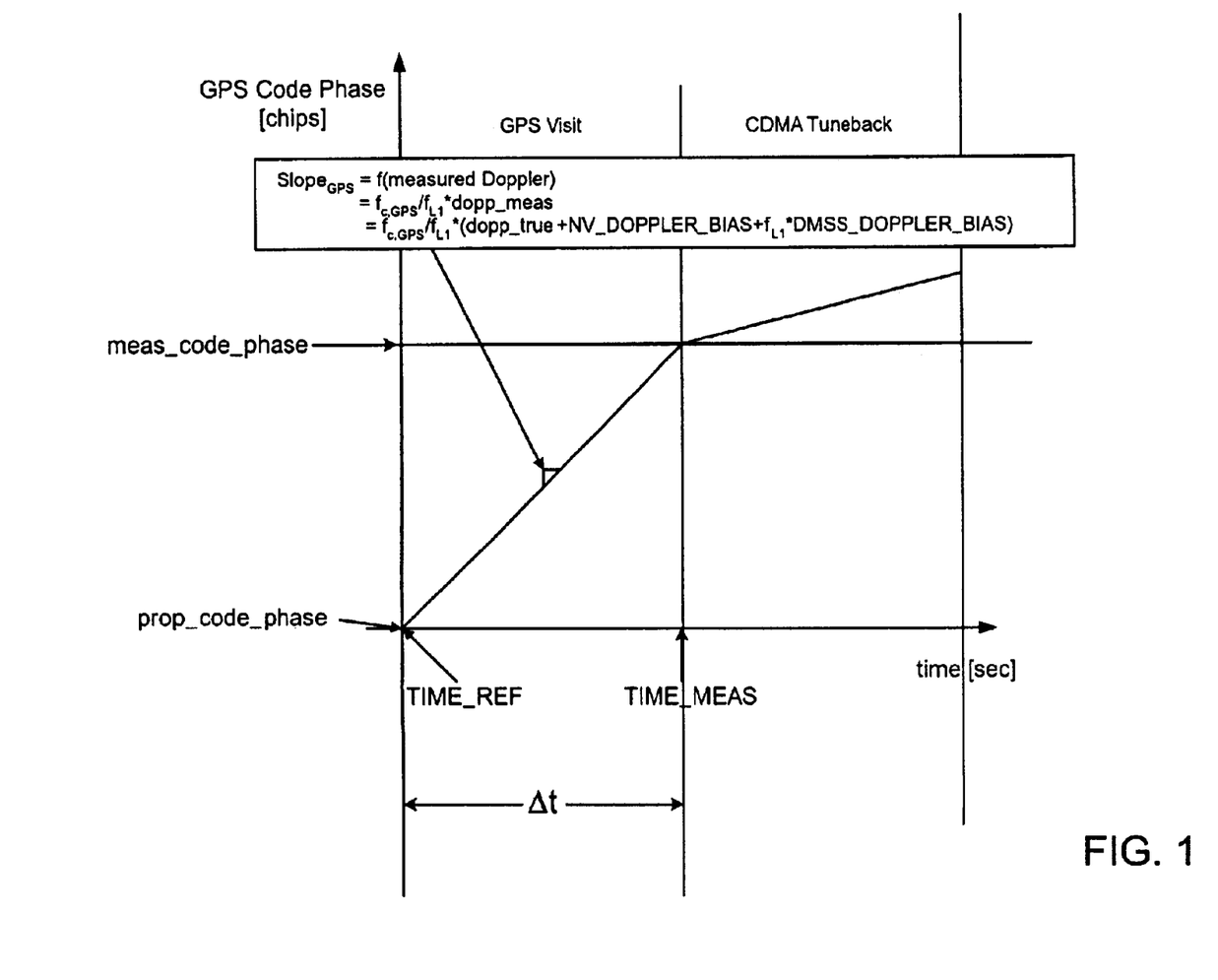
FIG. 1 illustrates GPS code phase measurement time propagation over a single GPS visit.

FIGS. 1 and 2a illustrate GPS code phase measurement propagation backward in time to an earlier TIME_REF, as will be described in more detail below. FIG. 2b illustrates propagation forward in time to a later TIME_REF, and is included to clarify the definitions used. For simplicity, all Figures assume DOPPLER1 is equal to 0.

Using the above definitions, we can write the following:

$\Delta t_{CDMA}$ = portion of $\Delta t$ spent in CDMA Tunebacks =

$$\begin{cases} 0, & \text{for } M = 0 \\ \sum_{i=1}^{M}(t_{2 \cdot i-1} - t_{2 \cdot i}), & \text{for } M > 0 \end{cases}$$

$\Delta t_{GPS}$ = portion of $\Delta t$ spent in GPS visits
       = $\Delta t - \Delta t_{CDMA}$ Note that for a GPS session consisting of only a single GPS visit, i.e. M=0, $\Delta t_{CDMA}=0$, and $\Delta t_{GPS}=\Delta t=$TIME_REF$-$TIME_MEAS.

Please note that as defined, □t, □$t_{GPS}$ and □$t_{CDMA}$ can all have positive or negative values, depending on whether the measurements are propagated forward (i.e. TIME_REF>TIME_MEAS) or backward (i.e. TIME_REF<TIME_MEAS) in time.

Assuming initially that both CDMA independent and CDMA dependent GPS doppler biases are constant during the entire GPS session whenever present, the equation for a GPS code phase measurement propagation then becomes prop_code_phase(TIME_REF) =          (EQ 1a)

meas_code_phase(TIME_MEAS) +

$\frac{f_{C_{GPS}}}{f_{LI}} \cdot [\Delta t \cdot (\text{dopp\_true}(\Delta t) + f_{LI} \cdot \text{DMSS\_NV\_ITEM}) +$ $\Delta t_{GPS} \cdot \text{NV\_DOPPLER\_BIAS}]$ As MS measures total GPS doppler at TIME_MEAS rather than dopp_true, all the calculations in MS will be in terms of total measured GPS doppler, dopp_meas. Expressing the above equation in terms of total measured GPS doppler, we get prop_code_phase(TIME_REF) =          (EQ 2)

meas_code_phase(TIME_MEAS) + $\frac{f_{C_{GPS}}}{f_{LI}} \cdot [\Delta t \cdot$ dopp_meas($\Delta t$) $- \Delta t_{CDMA} \cdot$ NV_DOPPLER_BIAS]

Note that both equations 1 and 2 work equally well with a single GPS visit situation, as in this situation the propagation of the measurement is not done over any CDMA tunebacks, such that $\Delta t_{CDMA}=0$. In the multi-visit case, however, Equation 1 will produce error in propagated code phase that is equal to $$\text{Error[GPS chips]} = -\Delta t_{CDMA} \cdot \frac{f_{C_{GPS}}}{f_{LI}} \cdot \text{NV\_DOPPLER\_BIAS} \quad (\text{EQ 3})$$

To further illustrate this point, FIGS. 1 and 2a illustrate GPS code phase propagation backwards in time for a session consisting of single and multiple GPS visits, respectively. For simplicity, DOPPLER1 is assumed zero for this example. To allow for the largest propagation times, TIME_REF is chosen to be at the beginning, while TIME_MEAS is at the end of the GPS visit for a single GPS visit session case, as illustrated in FIG. 1, and in the beginning of the first and at the end of the last GPS visit for the multi-visit session case, respectively, as illustrated in FIG. 2a.

FIG. 1 illustrates that both Equation 1 and Equation 2 provide the correct answer for prop_code_phase in a single GPS visit session case. Nevertheless, in a multiple GPS visit session case, as illustrated in FIG. 2a, Equation 1 will underestimate prop_code_phase by the error amount given in Equation 3. To quantify this error, assume NV_DOPPLER_BIAS equals 10 Hz, and DMSS_DOPPLER_BIAS=0 Hz. For 7 CDMA Tunebacks during this GPS session, $\Delta t_{CDMA}=14$ seconds, as shown in FIG. 2a, resulting in the code phase propagation error of 0.0909 GPS chips, or equivalently 26.66 meters, assuming DOP=1, or 53.23 meters assuming a DOP of 2, if Equation 1 is utilized rather than Equation 2 for GPS code phase propagation.

In addition, note that Equations 2 and 3, as well as all the Figures assume that the GPS doppler bias stays constant for the duration of the entire GPS session, that is to say, over multiple GPS visits for CDMA independent GPS doppler bias, and over both multiple GPS visits and CDMA Tunebacks for CDMA dependent GPS doppler bias. Note that this may not necessarily be true for the CDMA channel dependant portion of GPS doppler bias, as the wireless device may experience frequency handoff during any of the sessions CDMA Tunebacks. Therefore, if we assume N CDMA frequency handoffs during the GPS session, CDMA channel dependent portion of GPS doppler bias could change N times. Using consistent nomenclature, we can define N successive CDMA frequency handoffs between TIME_REF and TIME_MEAS, if any, as CDMA frequency handoffs 1, 2, . . . , N, where CDMA frequency handoff 1 is the CDMA frequency handoff closest in time to TIME_REF, CDMA frequency handoff 2 is the next closest in time to TIME_REF, and so forth, with CDMA frequency handoff N being the closest in time to TIME_MEAS. Further, $t_{HO1,2,\ldots,N}$ denotes the times at which the CDMA frequency handoffs 1, 2, . . . , N happen. Finally, the total GPS doppler bias and normalized CDMA dependent portion of GPS doppler bias between the successive CDMA, frequency handoffs i and (i+1) are denoted as dopp_bias$_i$ and DMSS_DOPPLER_BIAS$_i$, respectively, such that total GPS doppler bias and CDMA channel dependent portion of GPS doppler bias between the TIME_REF and $t_{HO1}$, are labeled dopp_bias$_0$ and DMSS_DOPPLER_BIAS$_0$, between the $t_{HO1}$ and $t_{HO2}$ are labeled dopp_bias$_1$ and DMSS_DOPPLR_BIAS$_1$, etc, and finally between $t_{HON}$ and TIME_MEAS labeled as dopp_bias$_N$ and DMSS_DOPPLER_BIAS$_N$, respectively.

The chosen labeling utilized may not coincide with the actual time sequence. When propagating GPS and AFLT code phase measurements backwards in time, labeling of N successive CDMA frequency handoffs and their times of occurrence, and labeling of the associated GPS dopplers coincide with the their order in time, with CDMA frequency handoff 1, $t_{HO1}$ and dopp_bias$_0$ being the first, and the CDMA frequency handoff N, $t_{HON}$ and dopp_bias$_N$ being the last in time. Alternatively, when propagating them forward in time, labeling of N successive CDMA frequency handoffs between the TIME_REF and TIME_MEAS, their times and corresponding GPS dopplers become contrary to their order in time.

Using the above definitions, we can write the following:

$$\text{dopp\_bias}_i = \begin{cases} \text{NV\_DOPPLER\_BIAS} + f_{LI} \cdot \text{DMSS\_DOPPLER\_BIAS}_i, & \text{during } GPS \text{ visit} \\ f_{LI} \cdot \text{DMSS\_DOPPLER\_BIAS}_i, & \text{during } CDMA \text{ tuneback} \end{cases}$$

where NV_DOPPLER_BIAS is CDMA channel independent portion of GPS doppler bias in Hz, assumed constant over all GPS visits during an entire GPS session, and DMSS_DOPPLER_BIAS$_i$ is CDMA channel dependent portion of GPS doppler bias between ith and (i+1)th CDMA frequency handoff, normalized to CDMA frequency it is calculated at. Using the above definitions, equation 1a becomes:

$$\text{prop\_code\_phase}(\text{TIME\_REF}) = \text{meas\_code\_phase}(\text{TIME\_MEAS}) + \quad \text{(EQ 3a)}$$

$$\Delta t \cdot \frac{fc_{GPS}}{f_{LI}} \cdot \text{dopp\_true}(\Delta t) + \Delta t_{GPS} \cdot \frac{fc_{GPS}}{f_{LI}} \cdot \text{NV\_DOPPLER\_BIAS} + fc_{GPS} \cdot$$

$$\begin{cases} \Delta t \cdot \text{DMSS\_NV\_ITEM}, & \text{for } N \\ (\text{TIME\_REF} - t_{HO_1}) \cdot \text{DMSS\_NV\_ITEM}_0 + (t_{HO_1} - \text{TIME\_MEAS}) \cdot \text{DMSS\_NV\_ITEM}_1, & \text{for } N \\ (\text{TIME\_REF} - t_{HO_1}) \cdot \text{DMSS\_NV\_ITEM}_0 + (t_{HO_N} - \text{TIME\_MEAS}) \cdot \text{DMSS\_NV\_ITEM}_N + \\ \sum_{i=2}^{N} (t_{HO_{i-1}} - t_{HO_1}) \cdot \text{DMSS\_NV\_ITEM}_{i-1}, & \text{for } N \end{cases}$$

As MS measures total GPS doppler at TIME_MEAS rather than dopp_true, all the calculations in MS will be in terms of total measured GPS doppler, dopp_meas. Expressing the above Equation 3a in terms of measured GPS doppler, Equation 2 in the presence of CDMA frequency handoffs during the GPS session then becomes:

$$\text{prop\_code\_phase}(\text{TIME\_REF}) = \quad \text{(EQ 4)}$$

$$\text{meas\_code\_phase}(\text{TIME\_MEAS}) + \Delta t \cdot \frac{fc_{GPS}}{f_{LI}} \cdot \text{dopp\_meas}(\Delta t) - \Delta t_{CDMA} \cdot \frac{fc_{GPS}}{f_{LI}} \cdot \text{NV\_DOPPLER\_BIAS} +$$

$$fc_{GPS} \cdot \begin{cases} 0, & \text{for } N = 0 \\ (\text{TIME\_REF} - t_{HO_1}) \cdot (\text{DMSS\_NV\_ITEM}_0 - \text{DMSS\_NV\_ITEM}_1), & \text{for } N = 1 \\ (\text{TIME\_REF} - t_{HO_1}) \cdot \text{DMSS\_NV\_ITEM}_0 + \sum_{i=2}^{N} (t_{HO_{i-1}} - t_{HO_1}) \cdot \text{DMSS\_NV\_ITEM}_{i-1} - & \text{for } N > 1 \\ (\text{TIME\_REF} - t_{HO_N}) \cdot \text{DMSS\_NV\_ITEM}_N, \end{cases}$$

The GPS doppler bias correction method disclosed herein will therefore use Equation 4 for propagating the GPS code phase measurements to common time prior to reporting them in the IS-801.1 PRM message to PDE, or prior to using them in the device's own position location engine.

Finally, in the case where wireless device designers opt to use PLLs that are deliberately designed to have static errors in the frequency output, the AFLT measurements will also experience the CDMA channel dependent CDMA code doppler. To ensure the proper propagation of all AFLT measurements to common time prior to them being reported to PDE via IS-801.1 PPM message or prior to them being used in the wireless device position location engine, this CDMA code doppler must be properly accounted for, according to the following equation:

$$\text{prop\_code\_phase\_AFLT(TIME\_REF)} = \text{meas\_code\_phase\_AFLT(TIME\_MEAS\_AFLT)} + \quad (EQ5)$$

$$fc_{CDMA} \cdot \begin{cases} \Delta t \cdot \text{DMSS\_NV\_ITEM}, & \text{for } N = \\ (\text{TIME\_REF} - t_{HO_1}) \cdot \text{DMSS\_NV\_ITEM}_0 + (t_{HO_1} - \text{TIME\_MEAS}) \cdot \text{DMSS\_NV\_ITEM}_1, & \text{for } N = \\ (\text{TIME\_REF} - t_{HO_1}) \cdot \text{DMSS\_NV\_ITEM}_0 + (t_{HO_N} - \text{TIME\_MEAS}) \cdot \text{DMSS\_NV\_ITEM}_N + \\ \sum_{i=2}^{N} (t_{HO_{i-1}} - t_{HO_1}) \cdot \text{DMSS\_NV\_ITEM}_{i-1}, & \text{for } N = \end{cases}$$

where the measured AFLT code phase for a particular pilot at time TIME_MEAS_AFLT is given by meas_code_phase_AFLT CDMA chips, and propagated AFLT code phase at a common time TIME_REF is given by prop_code_phase_AFLT CDMA chips; N is the number of CDMA frequency handoffs between TIME_REF and TIME_MEAS, and $t_{HO1,2,\ldots,N}$ are the times at which these CDMA frequency handoffs 1, 2, . . . , N happen, as previously defined.

A method as described above may be implemented, for example, by operating the wireless device to execute a sequence of machine-readable instructions. These instructions may reside in various types of signal-bearing media. In this respect, one aspect of the present invention concerns an article of manufacture comprising a signal-bearing media tangibly embodying a program of machine-readable instructions executable by a digital signal processor to perform a method to locate a transceiver used in a synchronous communications network employing wireless links.

This signal-bearing medium may comprise, for example, RAM (not shown) contained within the communications network. Alternatively, the instructions may be contained in another signal-bearing media, such as a magnetic data storage diskette or other digital medium, directly or indirectly accessible to the wireless device or system. Whether contained within the communications network or elsewhere, the instructions may be stored on a variety of machine-readable data storage media, such as a direct access storage device, magnetic tape, electronic read-only memory, an optical storage device, or other suitable signal-bearing storage media. In an illustrative embodiment of the invention, the machine-readable instructions may comprise lines of compiled C, or C++, or other suitable coding language commonly used by those skilled in the programming arts.

Thus, a method and apparatus for performing position location in a wireless communication system has been described. The previous description of the preferred embodiments is provided to enable any persons skilled in the art to make or use the present disclosure. The various modifications to these embodiments will be readily apparent to those skilled in the art, and the generic principles defined herein may be applied to other embodiments without the use of the inventive faculty. Thus, the present disclosure is not intended to be limited to the embodiments shown herein, but is to be accorded the right of scope consistent with the principles and novel features disclosed herein.

We claim:

1. A method of propagating AFLT pilot phase measurements to common time, comprising:
   determining a CDMA channel dependent CDMA code doppler bias; and
   accounting for the CDMA code doppler bias during time propagation of AFLT pilot phase measurements to common time, prior to reporting the AFLT pilot phase measurements to a position determining entity (PDE), or prior to using the AFLT pilot phase measurements in a position location engine in a wireless device.

2. The method of claim 1, wherein the propagation of AFLT pilot phase measurements is determined by continuously calculating the CDMA code doppler bias.

3. A method of optimizing GPS based position location in the presence of time-varying frequency error, comprising:
   determining a GPS doppler bias value including determining a CDMA code doppler bias value;
   centering a GPS doppler search window based on the GPS doppler bias value;
   adjusting for the GPS doppler bias value during GPS code phase measurement time propagation to common time; and
   adjusting for the CDMA code doppler bias value during AFLT code phase measurement time propagation to common time.

4. The method of claim 3, wherein the GPS doppler bias value is subtracted from a GPS measured doppler value prior to reporting the GPS measured doppler value to a position determining entity (PDE) or prior to using the GPS measured doppler value in a position location and/or a velocity engine in a wireless device.

5. A method of optimizing GPS based position location in the presence of time-varying frequency error, comprising:
   determining a GPS doppler bias value;
   centering a GPS doppler search window based on the GPS doppler bias value;
   adjusting for the GPS doppler bias value during GPS code phase measurement time propagation to common time;
   storing a CDMA channel independent GPS doppler bias value in a cellular device memory;
   storing a calculated CDMA channel dependent GPS doppler and CDMA code doppler bias values, wherein the stored CDMA channel dependent CDMA code doppler bias value is used to propagate AFLT code phase measurements to common time; and
   utilizing the CDMA channel independent GPS doppler bias value and the CDMA channel dependent GPS doppler bias value to re-center the GPS doppler search window for all search modes.

6. The method of claim 5, wherein the CDMA channel independent GPS doppler bias value and the CDMA channel dependent GPS doppler bias value are utilized to propagate GPS code phase measurement to common time.

7. A wireless communication device for optimizing GPS based position location in the presence of time varying frequency error, comprising:
   a receiver for receiving signals from a base station, the signals including an indication of the timing of a GPS satellite;

a GPS receiver; and a control processor coupled to the receiver and to the GPS receiver, and configured to use the received timing of the GPS satellite to determine a GPS search window center in doppler to search for the satellite;

wherein the GPS doppler search window center is determined by determining a total GPS doppler bias value and by centering the GPS doppler search window based on the total GPS doppler bias value, and wherein a CDMA channel dependent CDMA code doppler bias value is calculated and accounted for during time propagation of AFLT code phase measurements to common time prior to reporting the AFLT code phase measurements to a position determining entity (PDE) or using the AFLT code phase measurements in a wireless device position location engine.

8. A tangible data storage medium comprising executable data capable of causing a programmable device to perform the steps of:

determining a GPS doppler search window center for searching for a global positioning system (GPS) satellite, including the steps of:

determining a GPS doppler bias value including determining a CDMA code dopper bias value; and centering a GPS doppler search window based on the GPS doppler bias value; and accounting for GPS doppler and CDMA code doppler bias while propagating GPS pseudorange and AFLT pilot phase measurements, respectively, to common time.

9. The tangible data storage medium of claim 8, wherein the GPS doppler search window is determined by continuously measuring and/or calculating the GPS doppler bias value.

10. The tangible data storage medium of claim 8, further including the step of accounting for continuously measured and/or calculated GPS doppler bias and continuously calculated CDMA code doppler bias while propagating GPS pseudorange and AFLT pilot phase measurements, respectively, to common time.

* * * * *

UNITED STATES PATENT AND TRADEMARK OFFICE
CERTIFICATE OF CORRECTION

PATENT NO. : 6,903,684 B1
DATED : June 7, 2005
INVENTOR(S) : Emilija Simic, Christopher Patrick and Douglas Rowitch It is certified that error appears in the above-identified patent and that said Letters Patent is hereby corrected as shown below:

Column 9,
Line 47, equation (EQ 1a), the portion of the equation reading "DMSS_NV_ITEM" should read -- DMSS_DOPPLER_BIAS --.

Column 11,
Lines 26, 27, 28, 29 and 30, equation (EQ 3a), the portion of the equation reading "DMSS_NV_ITEM" should read -- DMSS_DOPPLER_BIAS --.
Lines 48, 50 and 52, equation (EQ 4), the portion of the equation reading "DMSS_NV_ITEM" should read -- DMSS_DOPPLER_BIAS --.

Column 13,
Lines 8, 9, 10, 11 and 12, equation (EQ 5), the portion of the equation reading "DMSS_NV_ITEM" should read -- DMSS_DOPPLER_BIAS --.

Signed and Sealed this

Twenty-second Day of November, 2005

JON W. DUDAS
*Director of the United States Patent and Trademark Office*